United States Patent
Guevara et al.

(10) Patent No.: US 10,474,612 B1
(45) Date of Patent: Nov. 12, 2019

(54) LANE REVERSAL DETECTION AND BIFURCATION SYSTEM

(71) Applicant: Dell Products L.P., Round Rock, TX (US)

(72) Inventors: Alberto David Perez Guevara, Pflugerville, TX (US); Wei G. Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/175,375

(22) Filed: Oct. 30, 2018

(51) Int. Cl.
  *G06F 13/40* (2006.01)
  *G06F 9/4401* (2018.01)
(52) U.S. Cl.
  CPC ........ *G06F 13/4027* (2013.01); *G06F 9/4411* (2013.01)
(58) Field of Classification Search
  CPC .................................................. H04L 2463/082
  See application file for complete search history.

(56) References Cited

U.S. PATENT DOCUMENTS

| 7,934,032 B1 * | 4/2011 | Sardella | G06F 13/4022 |
| | | | 710/104 |
| 7,957,428 B2 * | 6/2011 | Steinman | G06F 13/4009 |
| | | | 370/535 |
| 2017/0116090 A1 * | 4/2017 | Arroyo | G06F 11/2017 |

* cited by examiner

*Primary Examiner* — Henry Tsai
*Assistant Examiner* — Juanito Borromeo
(74) *Attorney, Agent, or Firm* — Haynes and Boone, LLP

(57) ABSTRACT

A lane reversal detection and bifurcation system includes an interface that includes a plurality of lanes that are coupled to an endpoint interface of an endpoint device and a BIOS that bifurcates the interface into a first root port and a second root port, such that the first root port is coupled to a first subset of the plurality of lanes, and the second root port is coupled to a second subset of the plurality of lanes. The BIOS initializes the endpoint device to establish a link between the endpoint device and the interface. The BIOS detects an endpoint presence and a non-functional link at the first root port and an endpoint presence and a functional link at the second root port and, in response, determines that the first subset of the plurality of lanes coupled to the endpoint device are subject to a lane reversal.

20 Claims, 6 Drawing Sheets

LANE REVERSAL DETECTION AND BIFURCATION SYSTEM

BACKGROUND

The present disclosure relates generally to information handling systems, and more particularly to detection of a reversal of lanes of an interface in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include peripheral devices that may be connected to the information handling system via a motherboard. For example, network cards, video cards, port expansion cards, storage devices, and/or a variety of other peripheral devices may be coupled to the motherboard using high-speed serial links in order to enhance the capabilities and performance of the information handling system. Peripheral Component Interconnect Express (PCIe) is a standard for such high-speed serial links between the motherboard and the peripheral device, and provides for communication between PCIe devices via a logical connection (a "link"), which is a point-to-point communication channel between two PCIe ports that allows for the sending and receiving of PCIe requests and interrupts. At the physical level, a link may include one or more lanes, and a lane may include two differential signaling pairs, with one pair utilized for receiving data and the other pair utilized for transmitting data. Thus, each lane may include four wires or signal traces. Conceptually, each lane may be used as a full-duplex byte stream, transporting data packets in an eight-bit "byte" format simultaneously in both directions between endpoints connected to a link. Physical PCIe links typically include from one to 32 lanes and, more precisely, 1 lane, 2 lanes, 4 lanes, 8 lanes, 12 lanes, 16 lanes, or 32 lanes, with PCIe links typically operating at transfer rates of 2.5 GT/s, 5.0 GT/s, 8.0 GT/s, 16.0 GT/s, or 32 GT/s.

An auto-bifurcation feature may be provided by a Basic Input/Output System (BIOS) that logically partitions lanes of a PCIe slot on the motherboard into one or more root ports during the boot of the motherboard. This allows a single PCIe slot to be coupled to one or more peripheral devices by automatically determining a lane width of those devices, and creating a root port having the same lane width. For example, a 16 lane PCIe slot may be bifurcated into 4 root ports that are each coupled to 4 lanes, 2 root ports each that are each coupled to 8 lanes, 1 root port that is coupled to 16 lanes, 3 root ports that include 1 root port that is coupled to 8 lanes and 2 root ports that are each coupled to 4 lanes, and so on. As such, in the example of 4 root ports that are each coupled to 4 lanes, 4 peripheral devices each having 4 lanes may be coupled to the PCIe slot. Bifurcating PCIe slots provides increased flexibility with regard to the types of peripheral devices that can be coupled to the motherboard without requiring specific PCIe slots for those devices. The auto-bifurcation feature also allows the BIOS to detect these configurations automatically so that a system administrator does not have to manually configure each PCIe slot.

However, conventional bifurcation techniques run into issues when lane reversal is implemented between the peripheral device and the PCIe slot. Lane reversal is a feature that provides flexibility in hardware platform design, layout, and routings, and is used by platform designers to simplify or reduce the number of layers on a printed circuit board in order to, for example, improve high speed signaling, achieve lane-to-lane length matching design rules, and/or for other benefits that would be apparent to one of skill in the art. However, bifurcation algorithms have to account for lane reversal in order to determine the correct bifurcation setting(s). For example, the lane reversal information may be gathered by the BIOS by reading manually coded information regarding which PCIe slots or PCIe ports are routed as a lane reversed crosslink. That lane reversal information is manually coded because there is no reporting mechanism that the BIOS can use to discover the lane reversal. Thus, conventional systems assume a preferred routing such as, for example, reversed or non-reversed routings, and the peripheral device may be tested to determine whether it is responsive or not based on the preferred routing. If the peripheral device is not responsive, an administrator may reset the system to change the lane reversal setting for the bifurcation setting. However, this solution increases boot time.

In another conventional system, the BIOS has knowledge of which slots or PCIe ports have a lane reversed routing, and that information is fed into the bifurcation algorithm, which allows the BIOS to select the correct bifurcation setting on the first pass and without the need for extra resets and their associated increased boot times. However, this solution limits the number of supported configurations on the system.

Accordingly, it would be desirable to provide an improved bifurcation system with lane reversal detection.

SUMMARY

According to one embodiment, an information handling system (IHS) includes an interface that includes a plurality of lanes; a processing subsystem coupled to the interface; and a memory subsystem that is coupled to the processing subsystem and that includes instructions that, when executed by the processing subsystem, causes the processing subsystem to provide a Basic Input/Output System (BIOS) that is configured to: bifurcate the interface into a first root port and a second root port, wherein the first root port is coupled to a first subset of the plurality of lanes, and where the second root port is coupled to a second subset of the plurality of lanes; initialize an endpoint device that includes an endpoint interface that is coupled to the interface to establish a link between the endpoint device and the interface; detect an endpoint presence and a non-functional link at the first root port; detect an endpoint presence and a functional link at the second root port; and determine, in response to the detecting the endpoint presence and the non-functional link at the first root port and the detecting the endpoint presence and the functional link at the second root port, that the first subset of the plurality of lanes coupled to the endpoint device are subject to a lane reversal.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
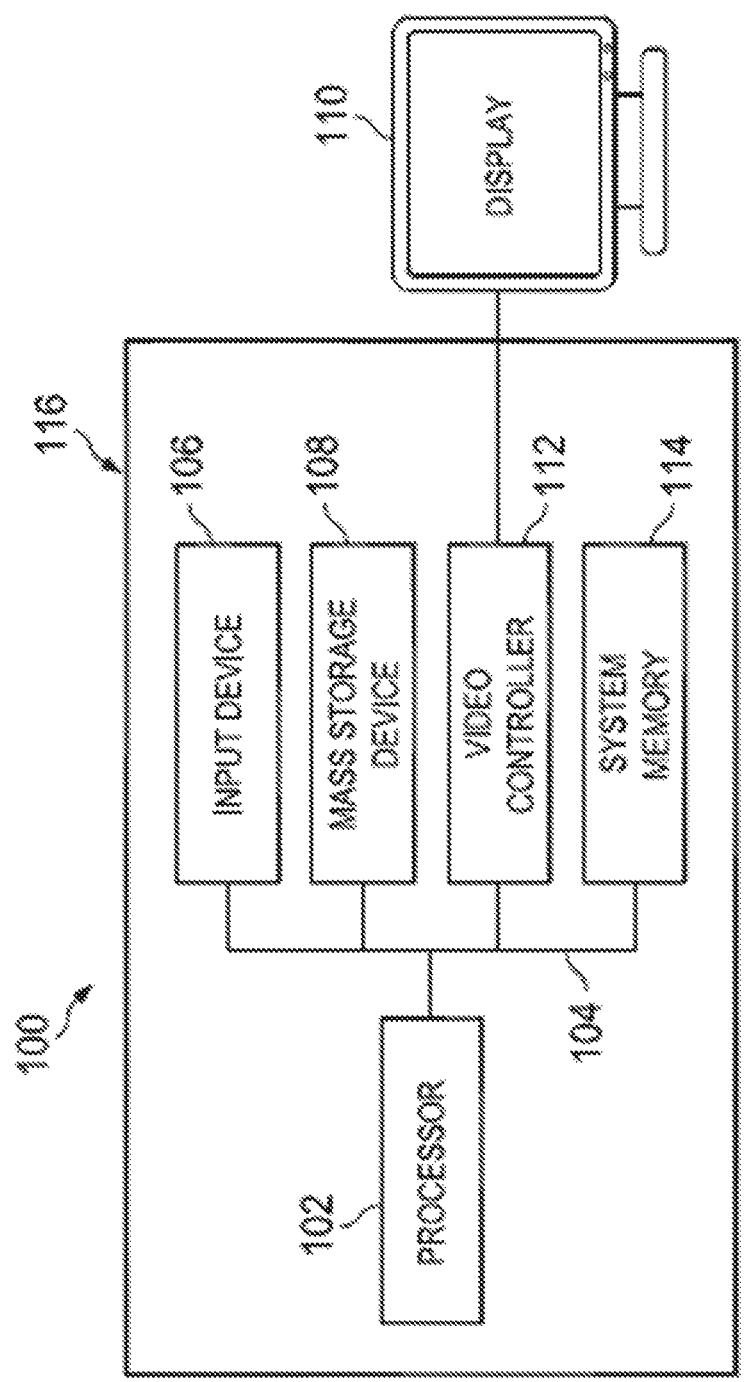
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
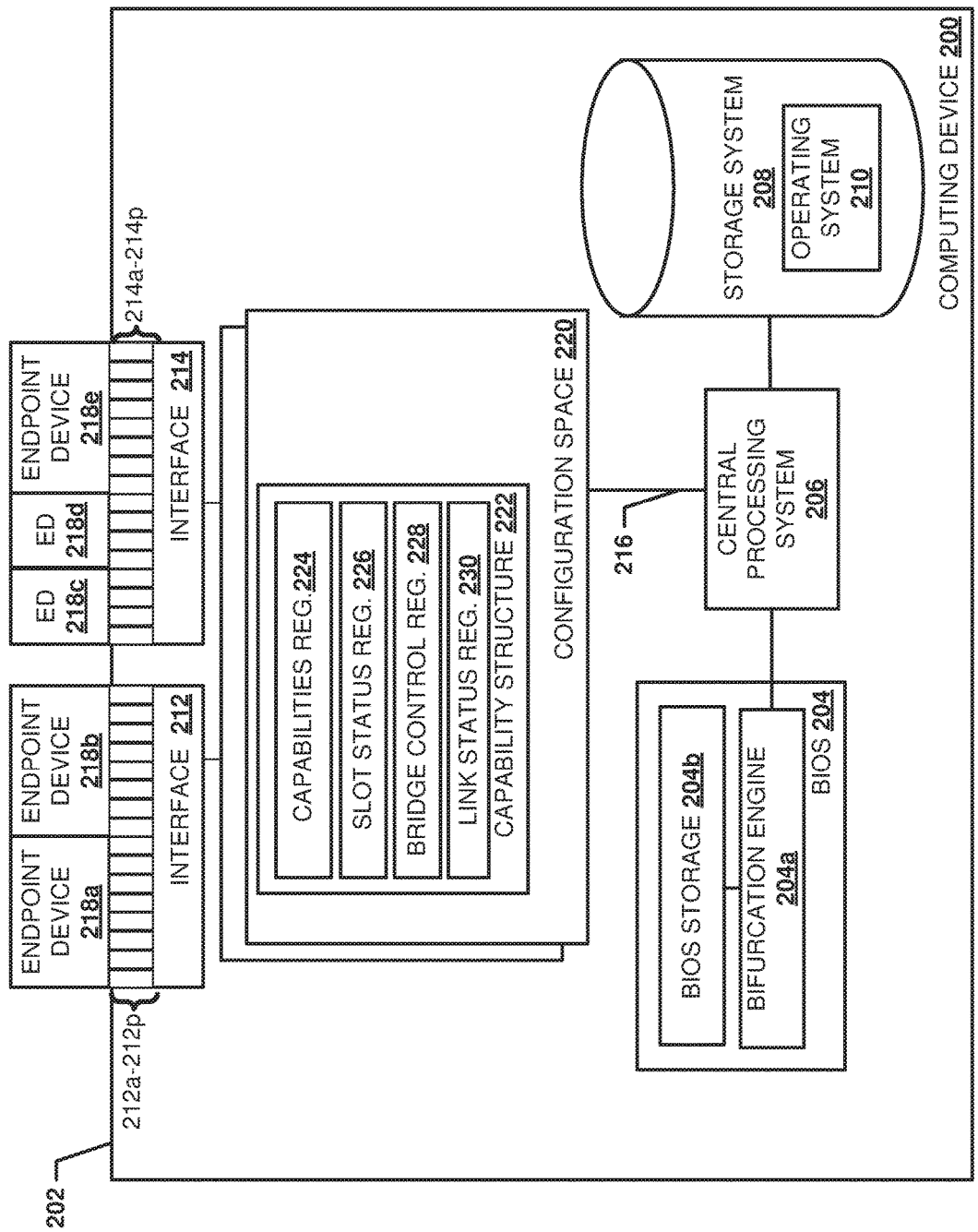
FIG. 2 is a schematic view illustrating an embodiment of a computing device that includes the lane reversal detection and bifurcation system of the present disclosure.

Referring now to FIG. 2, an embodiment of a computing device 200 is illustrated that may be provided by the IHS 100 discussed above with reference to FIG. 1, and/or may include some or all of the components of the IHS 100. In specific embodiments, the computing device 200 may be a server device, a desktop computing device, a laptop/notebook computing device, a tablet computing device, a mobile phone, and/or a variety of other computing devices that would be apparent to one of skill in the art in possession of the present disclosure. In the illustrated embodiment, the computing device 200 includes a chassis 202 that houses the components of the computing device 200, only some of which are illustrated in FIG. 2. For example, the chassis 202 may house a Basic Input/Output System (BIOS) processing subsystem (not illustrated, but which may include the processor 102 discussed above with reference to FIG. 1) and a BIOS memory subsystem (not illustrated, but which may include the memory 114 discussed above with reference to FIG. 1) that includes instructions that, when executed by the BIOS processing subsystem, cause the BIOS processing subsystem to provide a BIOS 204 that is configured to perform the functions of the BIOS and/or computing devices discussed below.

As would be appreciated by one of skill in the art in possession of the present disclosure, the BIOS 204 may be provided by non-volatile firmware (e.g., provided by the combination of the BIOS processing subsystem and BIOS memory subsystem discussed above) that is configured to perform hardware initialization during a booting process of the computing device 200, as well as provide runtime services for operating systems and/or other programs/applications executed on the computing device 200. While referred to as a "BIOS", one of skill in the art in possession of the present disclosure will recognize that the BIOS 204 may be provided according to the Unified Extensible Firmware Interface (UEFI) specification and, as such, may include or be coupled to a software interface between an operating system provided by the computing device 200 and platform firmware included in the computing device 200. Thus, the BIOS 204 may be provided by UEFI firmware that may also provide UEFI functionality, legacy support for BIOS services, and/or other functionality while remaining within the scope of the present disclosure as well.

In the illustrated embodiment, the BIOS 204 includes a bifurcation engine 204a that may be provided, for example, by the BIOS processing subsystem discussed above via the execution of instructions included on the BIOS memory subsystem discussed above. One of skill in the art in possession of the present disclosure will recognize that the bifurcation engine 204a is illustrated and described herein as providing the bifurcation functionality and lane reversal detection functionality of the present disclosure, and that the BIOS 204 may perform a variety of other BIOS functionality while remaining within the scope of the present disclosure as well. The BIOS 204 also includes a BIOS storage 204b that is coupled to the bifurcation engine 204a (e.g., via a coupling between the BIOS storage 204b and the BIOS processing subsystem), and that may store any of the information utilized as discussed below (e.g., the bifurcation rules, the lane reversal settings, and/or any other BIOS information that would be apparent to one of skill in the art in possession of the present disclosure.) In some examples, the BIOS storage 204b may be provided by a BIOS Serial Peripheral Interface (SPI) flash storage device, although other storage subsystems will fall within the scope of the present disclosure as well.

The chassis 202 may also house a central processing system 206 (e.g., a Central Processing Unit (CPU)) that is coupled to the bifurcation engine 204a provided by the BIOS 204 (e.g., via a coupling between the BIOS processing subsystem and the central processing system 206.) In various embodiments, the central processing system 206 may be configured to load BIOS instructions that provide the BIOS 204, execute the BIOS instructions to provide the BIOS 204 on one or more of cores of the central processing system 206, and/or perform other central processing system functionality that would be apparent to one of skill in the art in possession of the present disclosure. The chassis 202 may also house a storage system 208 that is coupled to the central processing system 206 and/or the BIOS 204. The storage system 208 may include any of a variety of storage devices and/or other components that allow for the storage of operating system (OS) instructions that are configured to provide an OS 210 that may be loaded during the boot process by the BIOS 204 and the central processing system 206, as well as any of the other data discussed below.

The chassis 202 may also house one or more interfaces such as an interface 212, and up to an interface 214. Each of the interfaces 212 and/or 214 may be coupled to the BIOS 204 and/or the central processing system 206 by one or more communication buses such as, for example, the communication bus(es) 216 illustrated in FIG. 2. In an embodiment, the one or more interfaces 212 and/or 214 may be board/card slots that are configured to receive edge connectors of one or more endpoint devices (e.g., endpoint devices 218a, 218b, 218c, 218d, and 218e illustrated in FIG. 2), ports that are configured to receive cable connectors to an endpoint device, and/or other interfaces that would be apparent to one of skill in the art in possession of the present disclosure as configured to couple with an endpoint device. For example, the interfaces 212 and 214 may include Peripheral Component Interconnect (PCI) slots, a PCI express (PCIe) slots, and/or a variety of other interfaces that would be apparent to one of skill in the art as benefitting from the teachings of the present disclosure. In the illustrated example, the interface 212 includes sixteen lanes 212a-212p, and the interface 214 includes sixteen lanes 214a-214p. While two interfaces 212 and 214 are illustrated in the chassis 202 each providing 16 lanes, one of skill in the art in possession of the present disclosure will recognize that any number of interfaces may be provided while remaining within the scope of the present disclosure, and those interfaces may provide any number of lanes such as, for example, one to 32 lanes and, more precisely, 1 lane, 2 lanes, 4 lanes, 8 lanes, 12 lanes, 16 lanes, 32 lanes, or any other number of lanes that would be apparent to one of skill in the art in possession of the present disclosure. Also, one of skill in the art in possession of the present disclosure will recognize that each interface 212 and 214 may be bifurcated into one or more root ports as discussed below.

In the illustrated embodiment, the endpoint devices 218a-218e are coupled to the interfaces 212 and 214. In various embodiments, the endpoint devices 218a-218e may include a computer-on-module that may be provided by the IHS 100 discussed above with reference to FIG. 1, and/or that may include some or all of the components of the IHS 100. However, in other embodiments, the endpoint devices 218a-218e may be provided by a network card, a video card, a port expansion card, a storage device, and/or any other endpoint devices 218a-218e that would be apparent to one of skill in the art in possession of the present disclosure. While the endpoint devices 218a-218e are illustrated as being external to the chassis 202, the endpoint devices 218a-218e may be coupled to the BIOS 204 and/or the central processing system 206 via an interface that is housed within the chassis 202 while remaining within the scope of the present disclosure as well.

The chassis 202 may house or be coupled to a configuration space 220 that is coupled to each interface 212 and 214, and that may be provided by one or more memory devices located in the chassis 202 and coupled to the communication bus 216. For example, each interface 212 and 214, and/or root port provided by the interfaces 212 and 214, may have its own configuration space 220. Each configuration space 220 may provide configuration information for each interface 212 and 214. For example, with respect to PCI/PCIe endpoint devices and PCI/PCIe slots, the configuration space 220 may provide a plurality of functions that the BIOS 204 and/or other configuration software may utilize to initialize and configure the interfaces 212 and 214 and the endpoint devices 218a-218e according to the PCIe Base Specification. In the illustrated embodiment, the configuration space 220 includes a capability structure 222. In addition to identifying an interface (e.g., the interface 212 or the interface 214), the capability structure 222 may be used to provide access to specific control and/or status registers and related power management enhancements. For example, the capability structure 222 may include a plurality of registers such as a capabilities register 224, a slot status register 226, a bridge control register 228, a link status register 230, other capability structure registers provided according to the PCIe Base Specification (when the interfaces 212 and 214 are PCI/PCIe interfaces), and/or other registers that would be apparent to one of skill in the art in possession of the present disclosure.

The capabilities register 224 may also include a capability version field, a device/port type field, a slot implemented field that indicates that a link associated with the root port is connected to a slot (e.g., as compared to being connected to a system-integrated endpoint device, or being disabled), and/or any other field that would be apparent to one of skill in the art in possession of the present disclosure. The slot status register 226 may include a presence detect change field, a presences detect state field (e.g., that indicates the presence of an adapter in the slot), a power fault detected field, and/or any other slot status register field that would be apparent to one of skill in the art in possession of the present disclosure. The bridge control register 228 may include a secondary bus reset field, and/or any other bridge control register that would be apparent to one of skill in the art. The link status register 230 may include a negotiated link width field, a current link speed field, a data link layer link active field, and/or any other link status fields that would be apparent to one of skill in the art in possession of the present disclosure. While specific examples of registers included in the capability structure 222 are illustrated and described, one of skill in the art in possession of the present disclosure would recognize that other registers may be included in the capability structure 222 without departing from the scope of the present disclosure. Also, when the interfaces 212 and 214 are PCI/PCIe interfaces, the registers described herein may include any register fields provided according to the PCIe Base Specification. While a specific computing device 200 has been illustrated and described, one of skill in the art in possession of the present disclosure will recognize that computing devices may include a variety of different components and/or component configurations that enable the performance of conventional computing device functionality, as well as the functionality discussed below, while remaining within the scope of the present disclosure.

Figure 3:
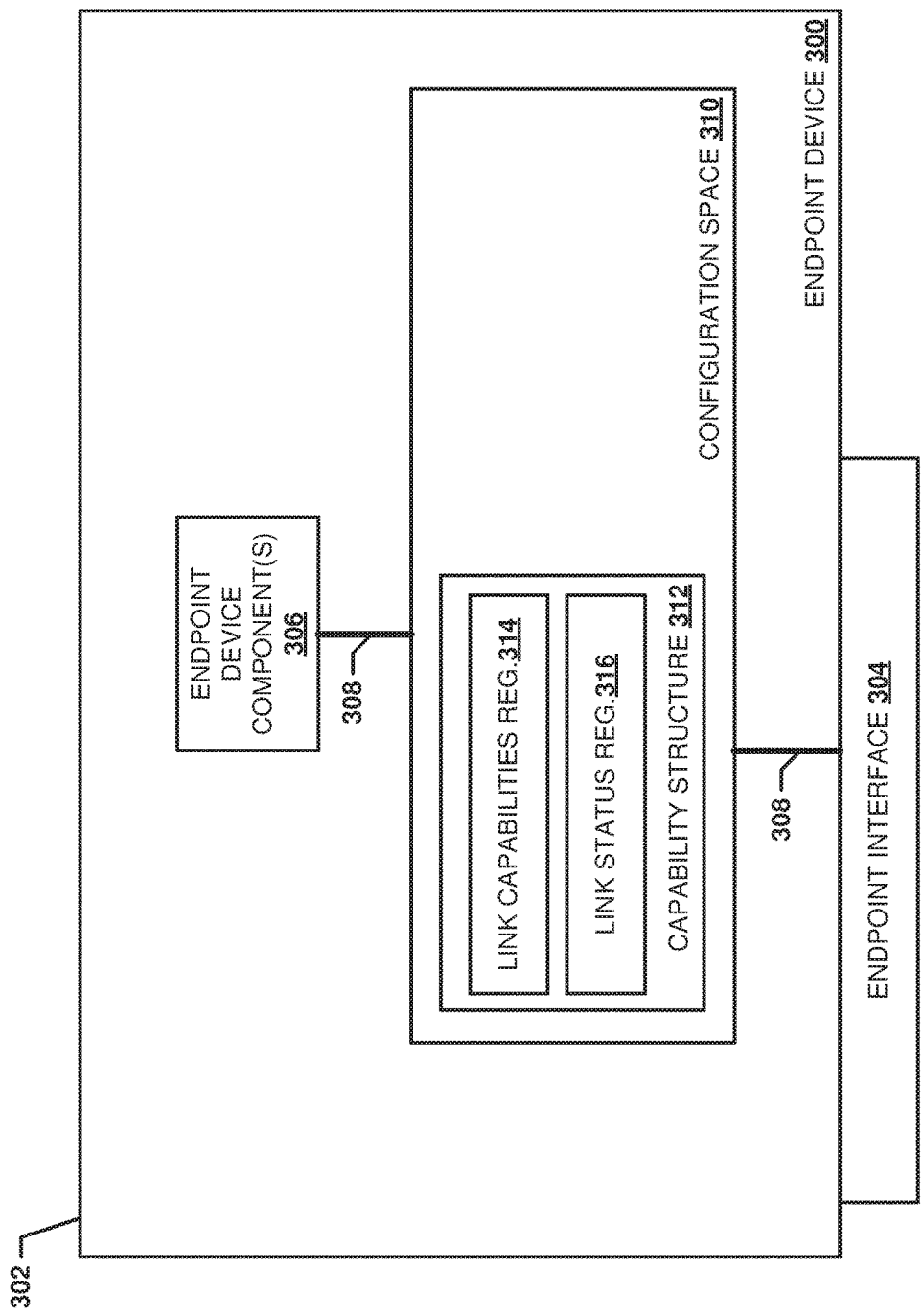
FIG. 3 is a schematic view illustrating an embodiment of an endpoint device that may be provided with the computing device of FIG. 2.

Referring now to FIG. 3, an embodiment of an endpoint device 300 is illustrated that may be any of the endpoint devices 218a-218e discussed above with reference to FIG. 2. As such, the endpoint device 300 may be provided by the IHS 100 discussed above with reference to FIG. 1, and/or may include some or all of the components of the IHS 100. In an embodiment, the endpoint device 300 may include a chassis 302 such as, for example, a printed circuit board or other endpoint device chassis known in the art. In the illustrated embodiment, the endpoint device 300 includes an endpoint interface 304 that is configured to couple with one or more of the interfaces 212 and 214 discussed above with reference to FIG. 2. In a specific example, the endpoint interface 304 may include a PCI connector, a PCIe connector, and/or any other interface that would be apparent to one of skill in the art in possession of the present disclosure. The endpoint interface 304 may include any number of lanes such as, for example, one to 32 lanes and, more precisely, 1 lane, 2 lanes, 4 lanes, 8 lanes, 12 lanes, 16 lanes, 32 lanes, or any other number of lanes that would be apparent to one of skill in the art in possession of the present disclosure. For example, if the endpoint device 300 is any of the endpoint devices 218a, 218b, or 218e, the endpoint interface 304 may include 8 lanes, while if the endpoint device 300 is any of the endpoint devices 218c or 218d, then the endpoint interface 304 may include 4 lanes.

One or more endpoint device components 306 may be located on or housed in the chassis 302, and may be coupled to the endpoint interface 304 via a bus 308. For example, the endpoint device component(s) 306 may include a variety of electrical and/or mechanical components that may be provided in and/or on the chassis 302, such as one or more interfaces (e.g., a memory card slot, a PCI card slot), various types of controllers, power connectors, processor connectors, heat sinks, memory systems, and/or other endpoint device components 306 that would be apparent to one of skill in the art in possession of the present disclosure. One of skill in the art will recognize that the endpoint device components 306 may vary due to the type of functionality the endpoint device 300 is configured to perform. For example, a graphics card may include a graphics processor, while a network card may include a network interface controller (NIC).

The chassis 302 may house or be coupled to a configuration space 310 that is coupled to the endpoint interface 304 via the bus 308, and that may be provided by one or more memory devices located on the chassis 302 and coupled to the bus 308. For example, in PCI/PCIe endpoint devices, the configuration space 310 may provide a plurality of functions that the BIOS 204 and/or other configuration software may utilize to initialize and configure the endpoint device 300. In the illustrated embodiment, the configuration space 310 includes a capability structure 312 having a plurality of registers such as a link capabilities register 314 and a link status register 316. The link capabilities register 314 may include a maximum link speed field, a maximum link width field, an active state link power management support field, an L0 exit latency field, an L1 exit latency field, a port number field, and/or any other field that would be apparent to one of skill in the art in possession of the present disclosure. The link status register 316 may include a current link speed field, a negotiated link width field, and/or a variety of other bits and fields that would be apparent to one skill in the art in possession of the present disclosure. While specific examples of registers included in the capability structure 312 are illustrated and described, one of skill in the art in possession of the present disclosure would recognize that other registers may be included in the capability structure 312 without departing from the scope of the present disclosure. Also, when the endpoint interface 304 is a PCI/PCIe interface, the registers described herein may include register fields provided according to the PCIe Base Specification. While a specific endpoint device 300 has been illustrated and described, one of skill in the art in possession of the present disclosure will recognize that endpoint devices may include a variety of different components and/or component configurations that enable the performance of conventional endpoint device functionality, as well as the functionality discussed below, while remaining within the scope of the present disclosure.

Figure 4:
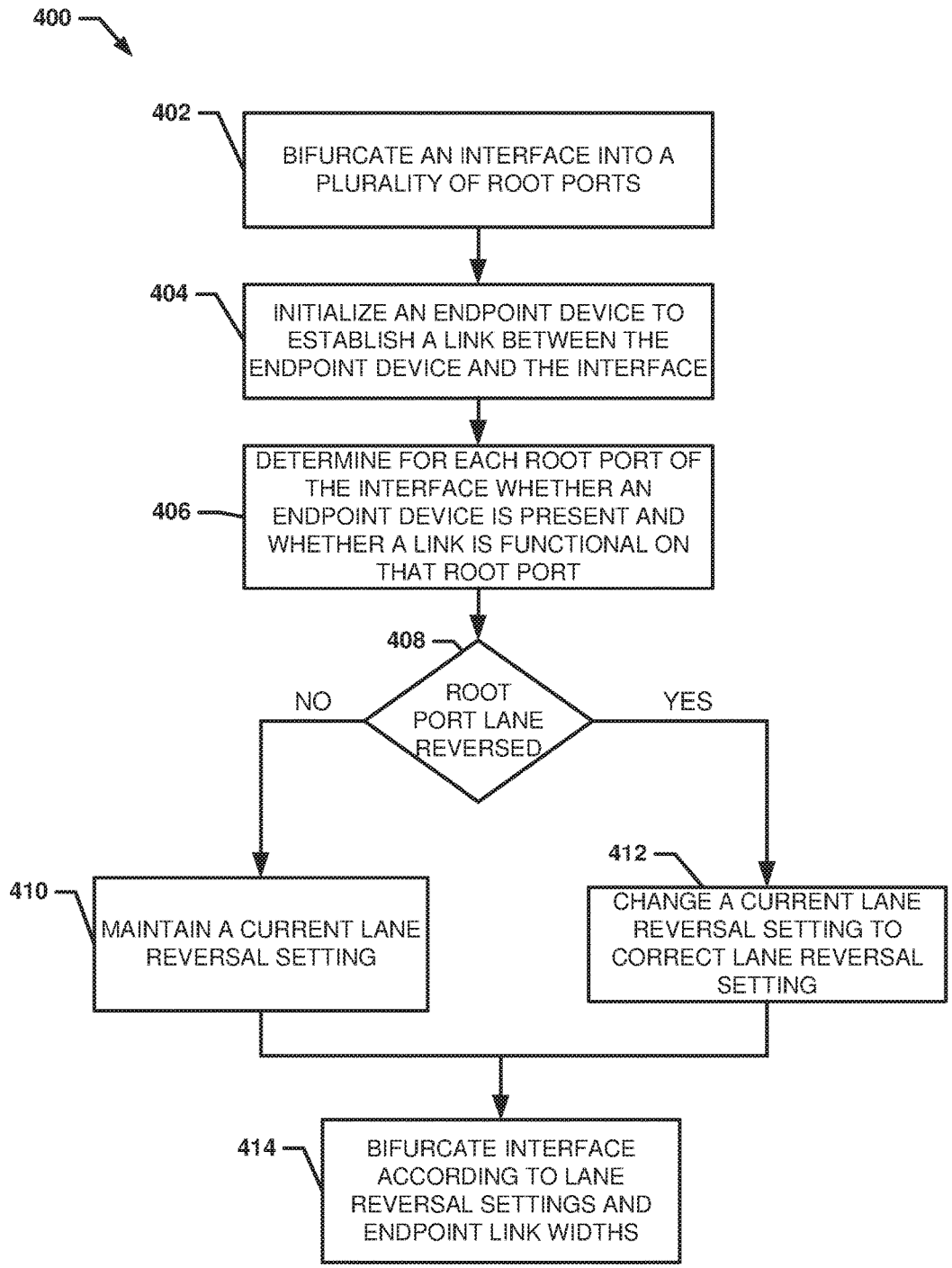
FIG. 4 is a flow chart illustrating an embodiment of a method for detecting lane reversal.

Referring now to FIG. 4, an embodiment of a method 400 for detecting lane reversal of an interface is illustrated. As discussed above, the systems and methods of the present disclosure provide for the detection of lane reversal of an interface between an endpoint device and a computing device. When a BIOS bifurcates an interface, the BIOS requires knowledge of whether the interface is configured with reversed lanes to ensure proper bifurcation settings. As discussed above, lane reversal information in conventional systems is gathered by the BIOS by reading manually coded information regarding which PCIe slots or PCIe ports are routed as a lane reversed crosslink, and that lane reversal information is manually coded because there is no reporting mechanism available to the BIOS to discover the lane reversal, as the lane reversal is implemented in the hardware. Thus, conventional systems assume a preferred routing such as reversed or non-reversed routings. The endpoint device can be tested to determine whether it is responsive or not based on the preferred routing, and if the endpoint device is not responsive, an administrator may reset the system to change the lane reversal setting for the bifurcation. However, such solutions lead to increased boot times. The systems and methods of the present disclosure allow the BIOS to detect lane reversal automatically by bifurcating an interface into a minimum supported granularity of root ports. The BIOS then performs minimal link training on each root port to detect an endpoint presence and a functionality of the link at a first root port, and detect an endpoint presence and a functionality of the link at a second root port. Based on the endpoint presence and the functionality of links on each of the first root port and the second root port, the BIOS may determine that the interface is lane reversed, and the interface may be bifurcated correctly according to the lane reversal and the detected endpoint device(s). As such, boot times are reduced, and the number of supported configurations on the computing device increases.

The method 400 begins at block 402 where an interface is bifurcated into a plurality of root ports. In an embodiment of block 402, the BIOS 204 may initiate a boot process for the computing device 200, and may bifurcate root ports of the interface 212 based on a predetermined granularity of lanes per root port (e.g., x1, x2, x4, etc.). For example, the predetermined granularity of lanes may be a minimum supported granularity of lanes. As such, a first root port may be coupled to a first subset of the plurality of lanes 212a-212p and a second root port may be coupled to a second subset of the plurality of lanes 212a-212p. Similarly, the BIOS 204 may initialize root ports of the interface 214 to a predetermined granularity of lanes per root port, as well as initialize root ports for any other interface that is provided in the computing device 200 of FIG. 2.

Figure 5:
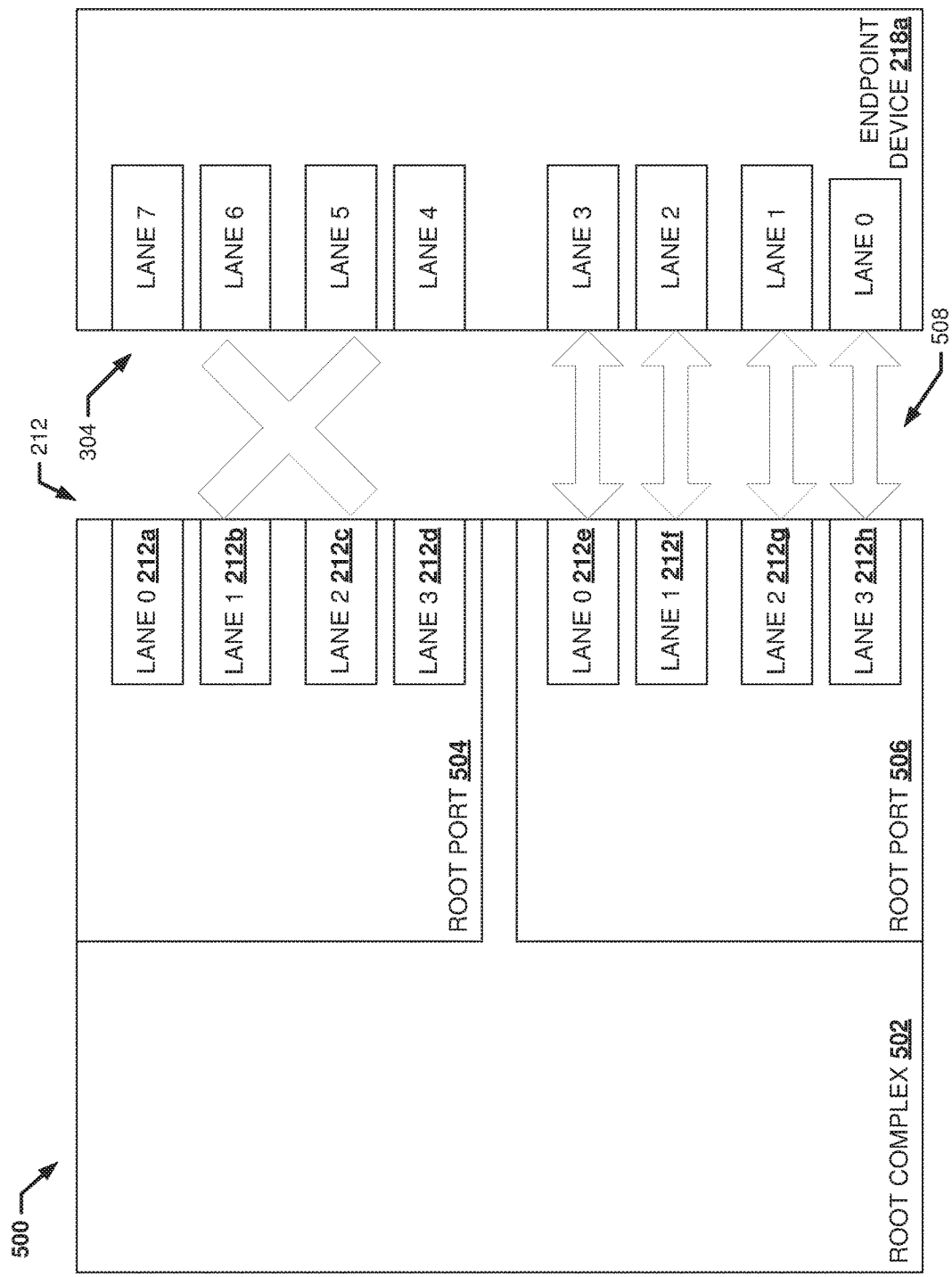
FIG. 5 is a schematic view illustrating an embodiment of the detecting of a lane reversal between the endpoint device of FIG. 3 and the computing device of FIG. 2 during the method of FIG. 4.

In an embodiment of block 402, and with reference to a computing device 500 of FIG. 5 that may be the computing device 200 of FIG. 2, a BIOS 204 may bifurcate root ports, which are coupled to the interface 212 and coupled to a root complex 502, to a predetermined granularity of four lanes (x4). For example, a root port 504 may be initialized and coupled to lanes 212a, 212b, 212c, and 212d, which are assigned "lane 0," "lane1," "lane 2," and "lane 3," respectively. Similarly, a root port 506 may be initialized and coupled to lanes 212e, 212f, 212g, and 212h, which are assigned "lane 0," "lane1," "lane 2," and "lane 3," respectively. Although not illustrated, the BIOS 204 may initialize a third root port that is coupled to four lanes (e.g., lanes 212i, 212j, 212k, and 212l, not illustrated, but based on the element numbering used in the example above), and a fourth root port that is coupled to four lanes (e.g., 212m, 212n, 212o, and 212p, not illustrated, but based on the element numbering used in the example above).

The method 400 may proceed to block 404 where an endpoint device is initialized to establish a link between the endpoint device and the interface. In an embodiment of block 404, the BIOS 204 may initialize the root ports of the interface 212 and the endpoint devices 218a and 218b. Similarly, the BIOS 204 may initialize the root ports of interface 214 and the endpoint devices 218c, 218d, and 218e. For example, the BIOS 204 may cause the root ports coupled to the interface 212 and/or the interface 214 to attempt to establish a link with the endpoint devices 218a, 218b, 218c, 218d, and/or 218e. During link initiation, an endpoint detection mechanism may be enabled at each root port in order to determine whether an endpoint device is present at the lanes of the interface 212. In a specific example where the interface 212 is a PCIe interface, when initializing each root port, the BIOS 204 may clear the presence detect change field in the slot status register 226. The slot status register 226 may be enabled when the BIOS 204 sets a bit defined by a slot implemented field in the capabilities register 224, which indicates that the PCIe device is a slot interface rather than an endpoint device. The BIOS 204 may then issue a secondary bus reset via the bridge control register 228. The BIOS 204 may then perform link training between each endpoint device 218a-218e and the root ports. For example, the BIOS 204 may perform minimal configuration and initialization for link configuration to establish a link between the endpoint devices 218a-218e and the root ports, and read the link width capabilities of the endpoint devices 218a-218e from the link capabilities register 314.

In an embodiment of block 404 and with reference to the computing device 500 of FIG. 5, the BIOS 204 may set the slot implemented field of the capabilities register 224 to "valid" for each of the root port 504 and the root port 506. When set, the slot implemented field of the capabilities register 224 according the PCI Express Base Specification indicates that the link associated with the port is connected to a slot (e.g., interface 212) rather than being disabled or connected to a system-integrated device (e.g., the endpoint interface 304 that is an edge connector). The slot implemented field is usually set to "valid" for downstream ports and undefined for upstream ports, and with the slot implemented field of the capabilities register 224 is set to "valid", the slot status register 226 (which may include a presence detect changed field) may be enabled. The presence detect changed field is set when the value reported in a presence detect state field of the slot status register is changed, and indicates the presence of an adapter (e.g., the endpoint device 218a) coupled to the interface 212, which is reflected by the logical "OR" of the Physical Layer in-band presence detect mechanism and, if present, any out-of-band presence detect mechanism defined for the corresponding form factor for the interface 212. The BIOS 204 may clear the presences detect changed field of the slot status register 226 and issue a bus reset by issuing a secondary bus reset via the secondary bus reset field of the bridge control register 228. When performed in each configuration space 220 for each root port 504 and 506, the secondary bus reset of the bridge control register 228 causes its respective root port 504 or 506 to reset.

The BIOS 204 may then perform link initialization and training for the root port 504 and the root port 506. Through each root port 504 and 506, the BIOS 204 may discover link width capabilities of the endpoint device 218a from the link width capabilities register 314. For example, when performing the link training for the root port 504, the BIOS 204 may determine that the endpoint device 218a has a maximum link width of x8 (e.g., 8 lanes). Similarly, when performing the link training for the root port 506, the BIOS may determine that the endpoint device 218a has a maximum link width of x8 as well, as both root ports 504 and 506 are connected to the same endpoint device 218a.

The method 400 may then proceed to block 406 where it is determined, for each root port of the interface, whether an endpoint device is present and whether a link is functional on that root port. In an embodiment of block 406, the BIOS 204 may determine whether the root ports of the interfaces 212 and 214 are coupled to an endpoint device. With the interfaces 212 and 214 coupled to endpoint device 218a-218e such that all the lanes 212a-212p and the lanes 214a-214p are occupied, each root port should detect, via the endpoint detection mechanism, the presence of an endpoint device. As discussed above, the BIOS 204 may determine that the presence detect change field of the slot status register 226 has been set to valid for a root port, which indicates that an endpoint device is coupled to the lanes of the interface that are coupled to the root port. The BIOS 204 may also determine whether there is a functional link on the root port after the link training. For example, the BIOS 204 may reference the link status register 230 to determine whether a link was established on the root port during the link initialization and training. The BIOS 204 may read the negotiated link width field and/or the current link speed field in the link status register 230 and/or the link status register 316 to determine whether there is an undefined value in either or both fields. In an embodiment, the checking for the presence detect change field form the root port perspective would follow a determination by the BIOS 204 that the link is not trained.

In an embodiment of block 406, and with reference to the computing device 500 of FIG. 5, the root port 504 may detect the presence of the endpoint device 218a based on the presence detect change field of the slot status register 226 indicating that an endpoint device is present at the lanes 212a-212d. However, no link may be established between the lanes 0-3 of interface 212 that are coupled to the root port 504 and the lanes 4-7 of the endpoint device 218a because the last lane ("lane 3") that is coupled to the root port 504 is not connected with an end lane (e.g., "lane 0") of the endpoint device. The root port 504 won't be able to match or find the corresponding lane 0 from the endpoint device 218a. As such, the link status register 230 for the root port 504 may indicate to the BIOS 204 that no link is established on the root port 504 after link training. Similarly, the root port 506 may detect the presence of the endpoint device 218a based on the presence detect change field of the slot status register 226 indicating that an endpoint device is present at the lanes 212e-212h. However, a functional link 508 may be established between the lanes 0-3 of the interface 212 that is coupled to the root port 506 and the lanes 0-3 of the endpoint device 218a because the last lane ("lane 3") coupled to the root port 506 is connected with an end lane ("lane 0") of the endpoint device 218a. As such, the link status register 230 for the root port 506 may indicate to the BIOS 204 that a link is established on root port 506 after link training.

The method 400 may then proceed to decision block 408 where it is determined that a root port is subject to lane reversal. In an embodiment of decision block 408, the BIOS 204 may determine that the interface is not subject to lane reversal if all of the root ports that detect an endpoint presence also provide a functional link with an endpoint device. However, the BIOS 204 may infer that the interface 212 is subject to lane reversal if at least one of the root ports detects a presence of an endpoint device, and detects a non-functional link at the root port. If the at least one root port that provides both a detected presence and a non-functional link is adjacent to a functional link, and the number of lanes determined from the link width of link capabilities register 314 of the endpoint device matches the number of lanes of the non-functional link root port and the functional link root port, the BIOS 204 may interpret this as a lane reversed scenario. Thus, if at decision block 408 no lane reversal is detected, the method 400 may proceed to block 410 where a current lane reversal setting is maintained. If at decision block 408 it is determined that a root port coupled to the interface is subject to lane reversal, the method may proceed to block 412 where a current lane reversal setting is changed to account for the lane reversal.

From block 410, or from block 412, the method 400 may proceed to block 414 where the interface is bifurcated to optimize the root ports to the link width of the endpoint device(s) coupled to the interface, and according to the lane reversal setting. In an embodiment of block 414, the BIOS 204 may use the lane reversal settings determined at block 410 or block 412 to calculate the bifurcation settings, which provides for the generation of the root ports coupled to the interface 212 and the interface 214 that correspond with the lane width of the detected endpoint device(s). The BIOS 204 may save bifurcation results in a non-volatile memory such as the BIOS storage 204b.

Figure 6:
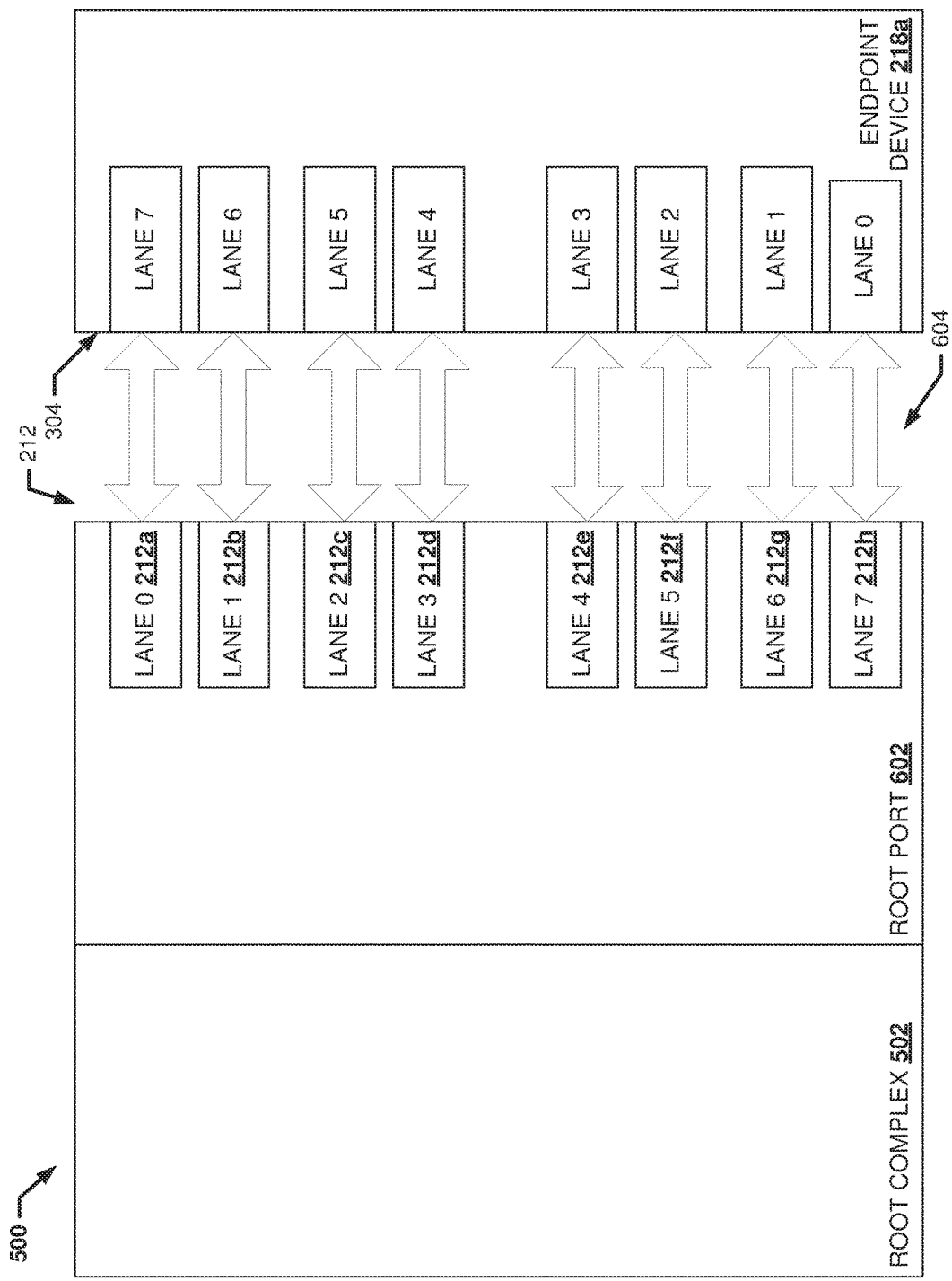
FIG. 6 is a schematic view illustrating an embodiment of the detecting of a lane reversal between the endpoint device of FIG. 3 and the computing device of FIG. 2 during the method of FIG. 4.

In an embodiment of block 414, and with reference to the computing device 500 of FIG. 6 that may be the computing device 500 of FIG. 5 after the lane reversal settings have been determined, the BIOS 204 may determine that, because the lanes 212a-212h of the interface 212 of the computing device 500 are lane reversed with respect to the lanes of the endpoint interface 304 of the endpoint device 218a, the interface 212 should be bifurcated to account for the lane width of the endpoint device 218a and the lane reversal. As such, based on the plurality of lanes 212a-212d of the root port 504 being subject to lane reversal, the BIOS 204 may generate a root port 602 that includes the plurality of lanes 212a-212d of the root port 504 and the plurality of lanes 212e-212h of the root port 506. Based on the detection by the BIOS 204 of an endpoint presence and the non-functional link at the root port 504, the detection by the BIOS of an endpoint presence and the functional link 508 at the root port 506, and the detection by the BIOS of the lane width of the endpoint device at each root port 504 and 506 as x8, and the detection by the BIOS that the root ports 504 and 506 were adjacent each other, the BIOS 204 may determine that an optimize root port for the lanes 212a-212h should be the root port 602 with 8 lanes 212a-212h, which will produce a functional link 604 with the endpoint device 218a when lane reversal is present.

Thus, systems and method have been described that provide for lane reversal detection to provide bifurcation of an interface according to the lane reversal. A BIOS may bifurcate an interface into root ports that are coupled to a predetermined lane width, and perform link initialization on those root ports to determine whether a link can be established and whether an endpoint device is detected at each root port. Using this information about which root ports have functional links or non-functional link, as well as information about root ports that detect a presence of an endpoint device or do not detect a presence of an endpoint device, the BIOS may determine whether any of the root ports are subject to lane reversal, and perform bifurcation of the interface based on whether the root ports were subject to lane reversal. As such, the BIOS does not have to rely on hardcoded information regarding which interfaces or ports in the platform are routed as lane reversed. Therefore, the BIOS may automatically determine which interfaces are lane reversed, and not have to undergo a system restart that allows an administrator to adjust the hardcoded information so that the BIOS can read the correct lane reversal setting. Thus, systems and methods of the present disclosure allow for a computing device to be provided with any width endpoint device inserted into a slot without the need to test for lane reversal, as the BIOS of the present disclosure is configured to automatically detect lane reversal and perform bifurcation without interruption from an administrator.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A lane reversal detection and bifurcation system, comprising:
  a chassis;
  a chassis interface that is accessible on the chassis and that includes a plurality of lanes;
  a first endpoint device that includes a first endpoint interface that is coupled to the chassis interface; and
  a Basic Input/Output System (BIOS) that is provided in the chassis and that is coupled to the chassis interface, and wherein the BIOS is configured to:
    bifurcate the chassis interface into a first root port and a second root port, wherein the first root port is coupled to a first subset of the plurality of lanes, and where the second root port is coupled to a second subset of the plurality of lanes, wherein the first endpoint device is coupled to the first subset of the plurality of lanes and the second subset of the plurality of lanes;

initialize the first endpoint device to establish a link between the first endpoint device and the chassis interface;

detect an endpoint presence and a non-functional link at the first root port;

detect an endpoint presence and a functional link at the second root port; and determine, in response to the detecting the endpoint presence and the non-functional link at the first root port and the detecting the endpoint presence and the functional link at the second root port, that the first subset of the plurality of lanes coupled to the first endpoint device are subject to a lane reversal.

2. The system of claim 1, wherein the determining that the first subset of the plurality of lanes coupled to the first endpoint device are subject to a lane reversal is also in response to determining that the first subset of the plurality of lanes included on the first root port and the second subset of the plurality of lanes included on the second root port are adjacent each other, and the first subset of the plurality of lanes and the second subset of the plurality of lanes correspond with a link width capability of the first endpoint device.

3. The system of claim 1, wherein the BIOS is further configured to:

bifurcate the chassis interface based on the first subset of the plurality of lanes coupled to the first endpoint device being subject to the lane reversal.

4. The system of claim 1, wherein the BIOS is further configured to:

bifurcate, based on the first subset of the plurality of lanes coupled to the first endpoint device being subject to the lane reversal, the chassis interface into a third root port that includes the first subset of the plurality of lanes and the second subset of the plurality of lanes.

5. The system of claim 4, wherein the BIOS is further configured to:

bifurcate, based on the first subset of the plurality of lanes coupled to the first endpoint device being subject to the lane reversal, the chassis interface into a fourth root port that includes at least a third subset of the plurality of lanes.

6. The system of claim 1, wherein the BIOS is further configured to:

clear a presence detect change bit of a chassis interface register prior to the initializing the first endpoint device to establish the link between the first endpoint device and the chassis interface, wherein the detecting the endpoint presence of the first endpoint device at the first root port includes detecting the presence detect change bit.

7. The system of claim 1, wherein the chassis interface is a Peripheral Component Interconnect (PCI) Express (PCIe) interface, and wherein the first endpoint device is a first PCIe device.

8. The system of claim 1, wherein the first subset of the plurality of lanes is equal to the second subset of the plurality of lanes.

9. An information handling system (IHS), comprising:
an interface that includes a plurality of lanes;
a processing subsystem coupled to the interface; and
a memory subsystem that is coupled to the processing subsystem and that includes instructions that, when executed by the processing subsystem, causes the processing subsystem to provide a Basic Input/Output System (BIOS) that is configured to:

bifurcate the interface into a first root port and a second root port, wherein the first root port is coupled to a first subset of the plurality of lanes, and where the second root port is coupled to a second subset of the plurality of lanes;

initialize an endpoint device that includes an endpoint interface that is coupled to the interface to establish a link between the endpoint device and the interface;

detect an endpoint presence and a non-functional link at the first root port;

detect an endpoint presence and a functional link at the second root port; and determine, in response to the detecting the endpoint presence and the non-functional link at the first root port and the detecting the endpoint presence and the functional link at the second root port, that the first subset of the plurality of lanes coupled to the endpoint device are subject to a lane reversal.

10. The IHS of claim 9, wherein the determining that the first subset of the plurality of lanes coupled to the endpoint device are subject to a lane reversal is also in response to determining that the first subset of the plurality of lanes included on the first root port and the second subset of the plurality of lanes included on the second root port are adjacent each other, and the first subset of the plurality of lanes and the second subset of the plurality of lanes correspond with a link width capability of the endpoint device.

11. The IHS of claim 9, wherein the BIOS is further configured to:

bifurcate the interface based on the first subset of the plurality of lanes coupled to the endpoint device being subject to the lane reversal.

12. The IHS of claim 9, wherein the BIOS is further configured to:

bifurcate, based on the first subset of the plurality of lanes coupled to the endpoint device being subject to the lane reversal, the interface into a third root port that includes the first subset of the plurality of lanes and the second subset of the plurality of lanes.

13. The IHS of claim 12, wherein the BIOS is further configured to:

bifurcate, based on the first subset of the plurality of lanes coupled to the endpoint device being subject to the lane reversal, the interface into a fourth root port that includes at least a third subset of the plurality of lanes.

14. The IHS of claim 9, wherein the BIOS is further configured to:

clear a presence detect change bit of an interface register prior to the initializing the endpoint device to establish the link between the endpoint device and the interface, wherein the detecting the endpoint presence of the endpoint device at the first root port includes detecting the presence detect change bit.

15. The IHS of claim 9, wherein the first subset of the plurality of lanes is equal to the second subset of the plurality of lanes.

16. A method of detecting a lane reversal, comprising:
bifurcating, by a Basic Input/Output System (BIOS), an interface having a plurality of lanes into a first root port and a second root port, wherein the first root port is coupled to a first subset of the plurality of lanes, and where the second root port is coupled to a second subset of the plurality of lanes;

initializing, by the BIOS, an endpoint device that includes an endpoint interface that is coupled to the interface to establish a link between the endpoint device and the interface;

detecting, by the BIOS, an endpoint presence and a non-functional link at the first root port;

detecting, by the BIOS, an endpoint presence and a functional link at the second root port; and determining, by the BIOS and in response to the detecting the endpoint presence and the non-functional link at the first root port and the detecting the endpoint presence and the functional link at the second root port, that the first subset of the plurality of lanes coupled to the endpoint device are subject to a lane reversal.

17. The method of claim 16, wherein the determining that the first subset of the plurality of lanes coupled to the endpoint device are subject to a lane reversal is also in response to determining that the first subset of the plurality of lanes included on the first root port and the second subset of the plurality of lanes included on the second root port are adjacent each other, and the first subset of the plurality of lanes and the second subset of the plurality of lanes correspond with a link width capability of the endpoint device.

18. The method of claim 16, further comprising:

bifurcating, by the BIOS, the interface based on the first subset of the plurality of lanes coupled to the endpoint device being subject to the lane reversal.

19. The method of claim 16, further comprising:

bifurcating, by the BIOS and based on the first subset of the plurality of lanes coupled to the endpoint device being subject to the lane reversal, the interface into a third root port that includes the first subset of the plurality of lanes and the second subset of the plurality of lanes.

20. The method of claim 16, further comprising:

clear a presence detect change bit of an interface register prior to the initializing the endpoint device to establish the link between the endpoint device and the interface, wherein the detecting the endpoint presence of the endpoint device at the first root port includes detecting the presence detect change bit.

* * * * *